(12) United States Patent
Mernyk et al.

(10) Patent No.: US 6,496,206 B1
(45) Date of Patent: *Dec. 17, 2002

(54) DISPLAYING THUMBNAIL IMAGES OF DOCUMENT PAGES IN AN ELECTRONIC FOLDER

(75) Inventors: Paul A. Mernyk, Palo Alto, CA (US); Steven Martin, Topsfield, MA (US); Bevra S. Prasad, Milpitas, CA (US); David L. Salgado, Victor, NY (US)

(73) Assignee: Scansoft, Inc., Peabody, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,154

(22) Filed: Jun. 29, 1998

(51) Int. Cl.$^7$ .................................. G06F 3/00
(52) U.S. Cl. ....................... 345/835; 345/764
(58) Field of Search .................. 345/333, 334, 345/335, 337, 339, 347, 338, 341, 353, 354, 369, 762, 763, 744, 707, 764, 808, 835, 839; 707/3, 4, 840, 314

(56) References Cited

U.S. PATENT DOCUMENTS

| | | |
|---|---|---|
| 3,648,249 A | 3/1972 | Goldsberry |
| 3,705,956 A | 12/1972 | Dertouzos |
| 4,177,354 A | 12/1979 | Mathews |
| 4,387,395 A | 6/1983 | Shaphorst |
| 4,424,575 A | 1/1984 | Clarke et al. |
| 4,430,526 A | 2/1984 | Brown |
| 4,475,239 A | 10/1984 | Raamsdonk |
| 4,488,000 A | 12/1984 | Glenn |
| 4,514,818 A | 4/1985 | Walker |
| 4,516,156 A | 5/1985 | Fabris et al. |
| 4,528,693 A | 7/1985 | Pearson et al. |

(List continued on next page.)

FOREIGN PATENT DOCUMENTS

EP 159400 10/1985

OTHER PUBLICATIONS

Macworld, "A Pair of Digitizing Tablets", published Mar. 1987 by PCW Communications, Inc., San Francisco, Calif. pp. 143–144.

"Method for Creating Annotation Data", IBM Technical Disclosure Bulletin, vol. 28, No. 4, Sep. 1985, pp. 1623–1628.

(List continued on next page.)

Primary Examiner—Raymond J. Bayerl
Assistant Examiner—Cao H. Nguyen
(74) Attorney, Agent, or Firm—Pillsbury Winthrop LLP (57) ABSTRACT

In a graphical user interface for accessing a large number of files, such as text files, graphics files, or spreadsheets, a system allows quick glances of "thumbnails" or highly reduced versions of the files. When a folder is opened, every file in the folder is opened as a background operation and thumbnail data, such as a reduced image or text summary of the file, is derived and retained in a cache folder for quick access. When a cursor is touched, without a mouse-click, to a particular icon in the opened folder, the thumbnail for the file identified by the icon is accessed from the cache folder and displayed.

19 Claims, 5 Drawing Sheets

U.S. PATENT DOCUMENTS

| | | |
|---|---|---|
| 4,528,988 A | 7/1985 | Wong |
| 4,552,991 A | 11/1985 | Hulls |
| 4,562,304 A | 12/1985 | Ward et al. |
| 4,570,033 A | 2/1986 | Hulls |
| 4,575,580 A | 3/1986 | Jandrell |
| 4,577,057 A | 3/1986 | Blesser |
| 4,580,007 A | 4/1986 | Searby |
| 4,582,955 A | 4/1986 | Blesser |
| 4,587,633 A | 5/1986 | Wang et al. |
| 4,616,336 A | 10/1986 | Robertson et al. |
| 4,633,416 A | 12/1986 | Walker |
| 4,633,436 A | 12/1986 | Flurry |
| 4,638,119 A | 1/1987 | Blesser et al. |
| 4,644,102 A | 2/1987 | Blesser et al. |
| 4,645,238 A | 2/1987 | Vincent et al. |
| 4,649,380 A | 3/1987 | Penna |
| 4,675,665 A | 6/1987 | Halliwell |
| 4,677,428 A | 6/1987 | Bartholow |
| 4,688,031 A | 8/1987 | Haggerty |
| 4,714,918 A | 12/1987 | Barker et al. |
| 4,723,836 A | 2/1988 | Kono et al. |
| 4,734,619 A | 3/1988 | Havel et al. |
| 4,742,473 A | 5/1988 | Shugar |
| 4,755,809 A | 7/1988 | Ikegami et al. |
| 4,785,564 A | 11/1988 | Gurtler |
| 4,899,136 A | 2/1990 | Beard |
| 4,926,484 A | 5/1990 | Nakano |
| 5,008,853 A | 4/1991 | Bly |
| 5,060,135 A | 10/1991 | Levine et al. |
| 5,072,412 A | 12/1991 | Henderson, Jr. et al. |
| 5,161,213 A | 11/1992 | Knowlton |
| 5,355,447 A | 10/1994 | Knowlton |
| 5,436,637 A | 7/1995 | Gayraud et al. |
| 5,499,108 A | 3/1996 | Cotte et al. |
| 5,500,935 A | 3/1996 | Moran et al. |
| 5,500,936 A | 3/1996 | Allen et al. |
| 5,517,332 A | 5/1996 | Barry et al. |
| 5,625,833 A | 4/1997 | Levine et al. |
| 5,644,692 A | 7/1997 | Eick |
| 5,715,416 A * | 2/1998 | Baker .......................... 345/349 |
| 5,761,655 A * | 6/1998 | Hoffman ........................ 707/4 |
| 5,819,261 A * | 10/1998 | Takahashi et al. ............. 707/3 |
| 5,995,101 A * | 11/1999 | Clark et al. .................. 345/338 |

OTHER PUBLICATIONS

"The Smalltalk Environment", by Tesler, L., BYTE Magazine, Aug. 1981, pp. 90–144.

"The Lisa Computer System: Apple Designs a New Kind of Machine", by Williams, G., BYTE Magazine, Feb. 1983, pp. 33–50.

"The Apple Macintosh Computer: Mouse–Window–Desktop Technology Arrives for Under $2500", by Williams, G., BYTE Magazine, Feb. 1984, pp. 30–54.

"System for Integrating and Collating Audio and Text, and for Text Creation and Editing", by P.D. Welch, IBM Technical Disclosure Bulletin, vol. 16, No. 2, Jul. 1973, pp. 500–503.

"Put—That—There": Voice and Gesture at the Graphics Interface by Richard A. Bolt, in ACM 1982, pp. 262–270.

Goodman, Danny, The Complete Hyercard Handbook (Bantam Books 1987), pp. 32–34.

Microsoft Corporation, Show Partner User's Guide (1986), Chaps. 3, 4, pp. 27–48.

"Designing the Star user Interface," by Smith, D.C., et al., BYTE Magazine, Apr. 1982, pp. 242–282.

"Visual Languages: A Tutorial and Survey," by Chang, Shi–Kuo, I.E.E.E. Software, Jan. 1987, v.4, No. 1, pp. 29–39.

Flow Chart Generator, Patent Abstracts of Japan, vol. 7, No. 198 (P–220) (1343) Sep. 2, 1983, JP–A–58–96360 (Abstract Only).

IBM Technical Disclosure Bulletin, Include Non–Text Objects In Margin Text, vol. 30, No. 7, Dec. 1987, p. 348.

Stefik et al., "WYSIWIS Revised: Early Experiences with Multiuser Interfaces", ACM Transactions on Office Information Systems, vol. 5, No. 2, Apr. 1987, pp. 147–167.

Pratt, William, "Digital Image Processing", A Wiley–Interscience Publication, 1978, pp. 322–323.

* cited by examiner

DISPLAYING THUMBNAIL IMAGES OF DOCUMENT PAGES IN AN ELECTRONIC FOLDER

FIELD OF THE INVENTION

The present invention relates to graphical user interfaces such as used with general-purpose computers, and relates more specifically to systems for obtaining overviews of icons or other display graphics representing relatively large quantities of data.

BACKGROUND OF THE INVENTION

In the computer industry, use of graphical user interfaces, or GUIs, is well known for enabling a user to select a particular file of data (such as a word-processing file, or a graphics file) from a large available selection. A GUI is a type of display format that enables a user to operate a computer by pointing to pictorial representations, such as "windows" and "icons," displayed on a screen device. A window is a rectangle displayed on the screen that affords a user work space within a program. In typical operation, the user may move the window about on the screen, change its size or shape, enlarge it to fill the screen, close it entirely, or change how much of its contents are displayed.

To navigate within a GUI, such as to select a particular file to be opened, most systems employ a screen cursor or pointer, typically displayed as a small arrow which allows the user to select individual points on the screen. In operation, the cursor is moved to a desired screen location in response to movements of a pointing device (e.g., a mouse, trackball, or equivalent) by the user. Besides effecting cursor movement, most pointing devices include one or more switches or "mouse buttons" for specifying additional user input or user events. Since many user choices may be entered through use of a pointing device instead of input with a keyboard, the need for the user to memorize special commands is lessened.

With particular reference to accessing data desired to be viewed, a standard arrangement of a GUI is to provide a hierarchy of containers into which individual files can be organized. For instance, a set of "files" can be placed in a "folder," a set of "folders" can be placed in a "drawer," and so forth, up to items which may characterized as cabinets or drives. For present purposes, the important fact is that the basic unit of a set of data which may be wished to be viewed is here called the "file": a file may be a word-processing document, a graphics-program document, a spread sheet, or some other form of data that is capable of making sense standing alone. Also for present purposes, all containers which may contain one or more files will be called a "folder," even though in different contexts folders may exist within other folders, and higher-level metaphors may be used, such as drawer and cabinet.

When a folder is opened in the context of a GUI, there is typically displayed a rectangular space on the screen, and within this rectangular space is displayed a set of icons, each icon being associated with one file (such as a text or graphics file) in the folder. In common operating systems such as Macintosh® or Windows™, documents of a particular type, such as word-processing documents, are typically all assigned icons of a identical basic appearance, such as of a sheet with a folded corner, or a stylized capital W. By and large, the only way to distinguish between icons of a type relating to different files is to associate with each icon a short file name which is displayed underneath the icon. However, very often, a file name which makes sense to the creator of the file will be largely meaningless to another user.

The present invention is a utility, which can be superimposed over an existing operating system such as Windows™, that enables a user to quickly identify the basic contents of each of a large number of files which are identified as icons within a folder in a GUI.

DESCRIPTION OF THE PRIOR ART

U.S. Pat. No. 5,436,637 describes a graphical user interface including providing "hints" for screen objects of interest. When a cursor merely touches a particular icon on the screen, a status frame or window, which is positioned in a non-intrusive fashion below or to one side of an active portion of the user interface, is continually updated with descriptive information relating to a particular icon as a screen cursor moves from one icon to another. The patent further contains a general background description of a utility known as "balloon help," in which graphical buttons a toolbar in a graphical user interface are provided with "pop-ups" or "balloons" which appear next to the cursor to explain the function of the button.

U.S. Pat. No. 5,500,935 discloses a graphical user interface system which allows the user to implement pop-up menus and gestural marks when the input location in the GUI is restricted, such as in a corner region. In such a situation, the system translates the desired pop-up menu from one location where space is limited to another location where space is essentially unlimited, and then provides an indicator or a guide to direct the user to make the required movement of the cursor to the unrestricted location.

U.S. Pat. No. 5,500,936 discloses a multi-media slide presentation system which can be superimposed on a standard computer GUI. Each slide in the multimedia slide presentation may contain photographs, text, graphics, and charts. By actuating and releasing a control button of the mouse or trackball, a pop-up menu is displayed to aid the user to make selections that operate on the slides and objects on the slides. The text menu items may also indicate pop-up menus when selected.

U.S. Pat. No. 5,644,692 discloses a specialized GUI for displaying information about a very large number of entities, such as files. The entity representations in the GUI are contained in columns which represent contexts for the entities. In one embodiment, the entities are lines of text and the contexts are files containing the lines. A selector with a set of colored fields corresponding to values of attributes of the entities is provided. When either an entity representation or a selector field is activated by means of a pointing device, the selector field and all of the entity representations for entities of the attribute value corresponding to the selector are turned on and appear in the same color. The pointing device may also be used to specify an entity representation for detailed viewing.

SUMMARY OF THE INVENTION

According to one aspect of the present invention, there is provided a method of displaying a thumbnail relating to an electronically-stored file in an electronically-stored folder, the folder being capable of retaining a plurality of files. At least one icon relating to a file retained in the folder is displayed. Thumbnail data is derived for each file in the folder. The thumbnail data for each icon in the folder is stored in a cache, and an association is created between each file in the folder and the thumbnail data relating to the file in the cache. When the icon relating to a file in the folder is indicated by a cursor, the thumbnail data relating to the file relating to the icon is retrieved from the cache and displayed.

According to another aspect of the present invention, there is provided a method of displaying a thumbnail relating to an electronically-stored file in an electronically-stored folder, the folder being capable of retaining a plurality of files. At least one icon relating to a file retained in the folder is displayed. When the icon relating to a file is indicated by a cursor, the thumbnail data relating to the file related to the icon is displayed by touching the cursor to the icon without a mouse-click.

DETAILED DESCRIPTION OF THE INVENTION

For purposes of elucidating the specification and claims, the following terms will be defined:

A "thumbnail" is a quantity of data which is derived from a larger quantity of data, such as a file. To obtain a thumbnail, one page image from the file can be opened and optically reduced or scaled to a smaller size; or, alternately, discrete portions of data from the file can be pulled from the file, such as key words, a pre-written or artificially derived summary of the data, a title, a list of column headings, any text strings which are found to be of larger than usually type size which would be consistent with headlines, etc. The "thumbnail data," as used in the claims, is a quantity of data, which may be in form example ASCII format, which is culled from a file and which may be displayed in another format in the resulting thumbnail.

A "folder," for purposes of the present description and claims, is a term which can be applied to any container that can hold one file or a plurality of files.

An "icon" is in a basic sense a bitmap of a predetermined design, which the human user can identify as relating to a file, or at least to a file of a certain type. In addition, within the scope of the invention, the term "icon" can also be applied to a displayed file name, particularly in the context of a displayed tree of folders having files therein.

A "cursor" is a displayable pointing device, which is typically in the form of an arrow bitmap which is used to point to a particular icon, although this term could be applied broadly to encompass other methods of pointing to an icon, such as using a touch-screen, electronic pen, or a special alphabet.

A "background operation" is an action performed by the operating system of a computer, in a manner which is generally not apparent to the user through the display, or at least is performed by the operating system in a manner whereby the user can perform some other function while the background operation is taking place.

Figure 1:
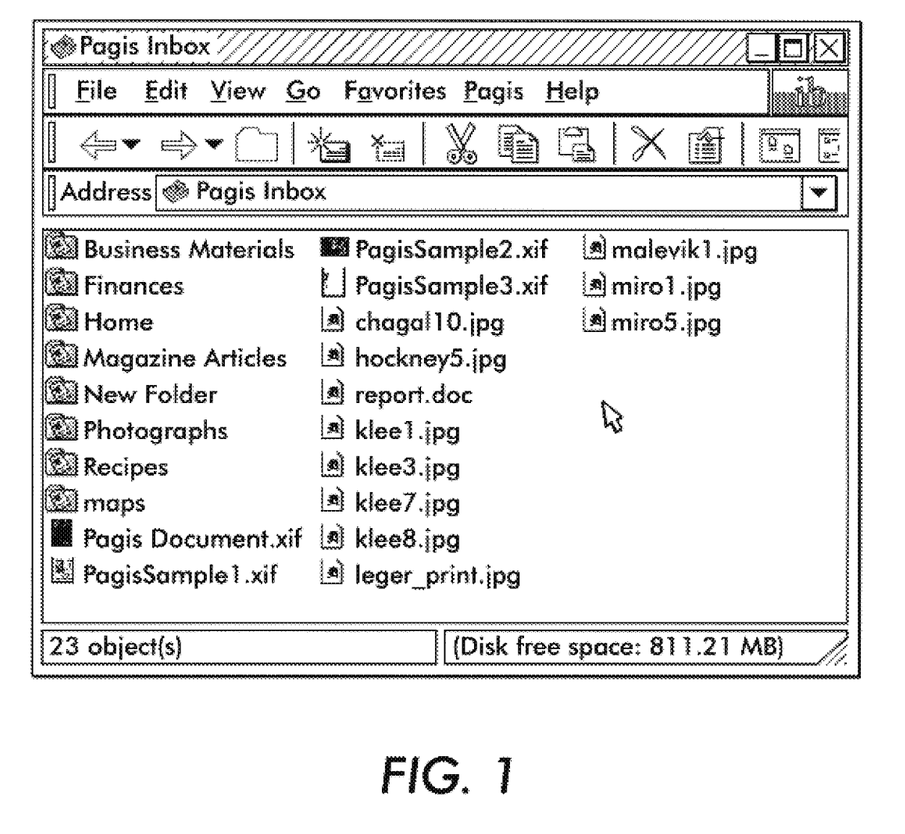
FIG. 1 is a representation of a typical folder display, as in the prior art.

FIG. 1 is an example of a graphic display of a "folder," in the specific case an Inbox having a toolbar and pull-down menus associated therewith, as would be used in conjunction with the present invention. As can be seen, the displayed folder includes a rectangular area with icons of the files contained in the folder. It will also be noted that some of the items in the folder are themselves folders, and may contain further folders and files. The type of entity which appears in the folder, whether a subsidiary folder, a text file, or a graphics file, determines the appearance of the particular icon associated with the file name. For folders within folders forming a hierarchy, it is known in the art to display multiple layers of folders in a "tree" structure.

Figure 2:
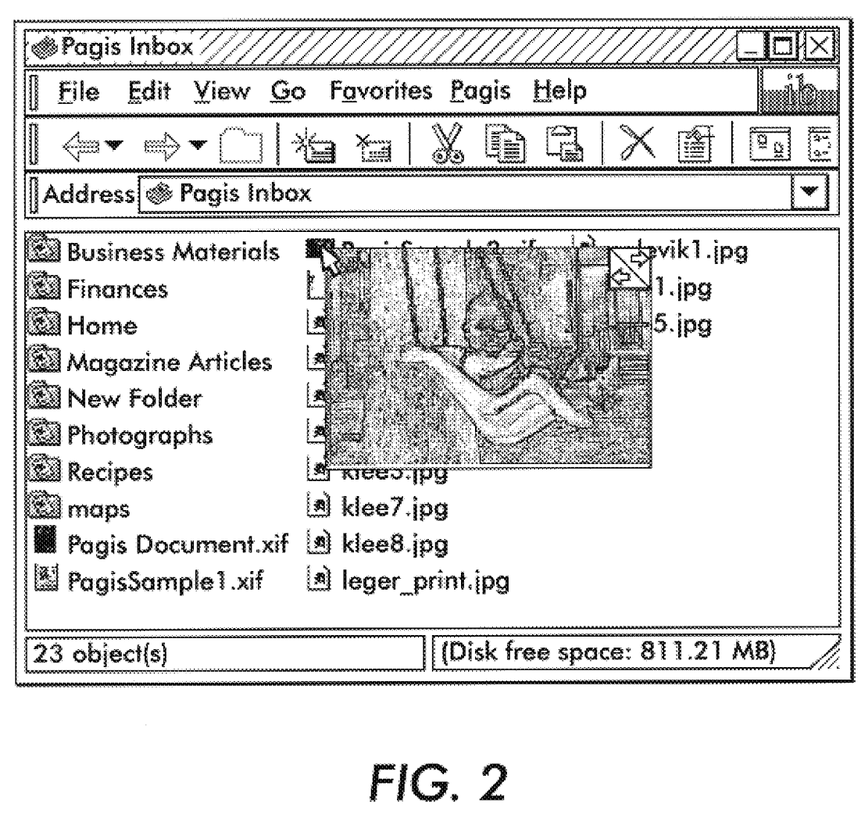
FIG. 2 is a demonstration of the display of a thumbnail of a graphics file according to the present invention.

FIG. 2 is an example display of a "thumbnail" associated with a file in a folder, showing the desired result of the present invention. When the cursor, shown as the small arrow in FIG. 2, is merely touched onto an icon within the folder, that icon being associated with the file, a "thumbnail" of the image forming the file is displayed. As can be seen in FIG. 2, this "thumbnail," in the case of a graphics file such as shown as "PagisSample2.xif" a reduced version of the image is displayed in a manner which associates the thumbnail with the indicated icon. In this manner, a person having a folder with a large number of text or graphics files, each file having a cryptic file name, can quickly glance at a thumbnail derived from the file so that the user can identify the thumbnail with the file. (For illustrative purposes, what is shown in the present FIG. 2 is intended to represent a reduced-size photograph.).

To optimize consumer satisfaction, the thumbnails such as shown in FIG. 2 must appear essentially immediately after the cursor touches the icon in question. If too much time is taken in order to generate the thumbnail, this time could have just as well been used to open the particular file. The underlying method of the present invention thus contemplates using a "cache" memory, which is basically a file not directly apparent to the user, for obtaining just enough data to generate the thumbnails of the icons contained in the folder which is displayed to the user. By maintaining the thumbnail data in the cache memory, the thumbnail data for each individual icon being relatively small, the thumbnail for the various icons in the folder can be displayed to the user with a satisfactory speed after the particular icon is touched with the cursor. When a particular folder having files therein is opened by the user, a corresponding "cache folder" is created on an ad-hoc basis. The cache folder is a folder of files of thumbnail data, but each file in the cache folder corresponds to and is associated with a file in the folder which is displayed to the user.

Figure 3A:
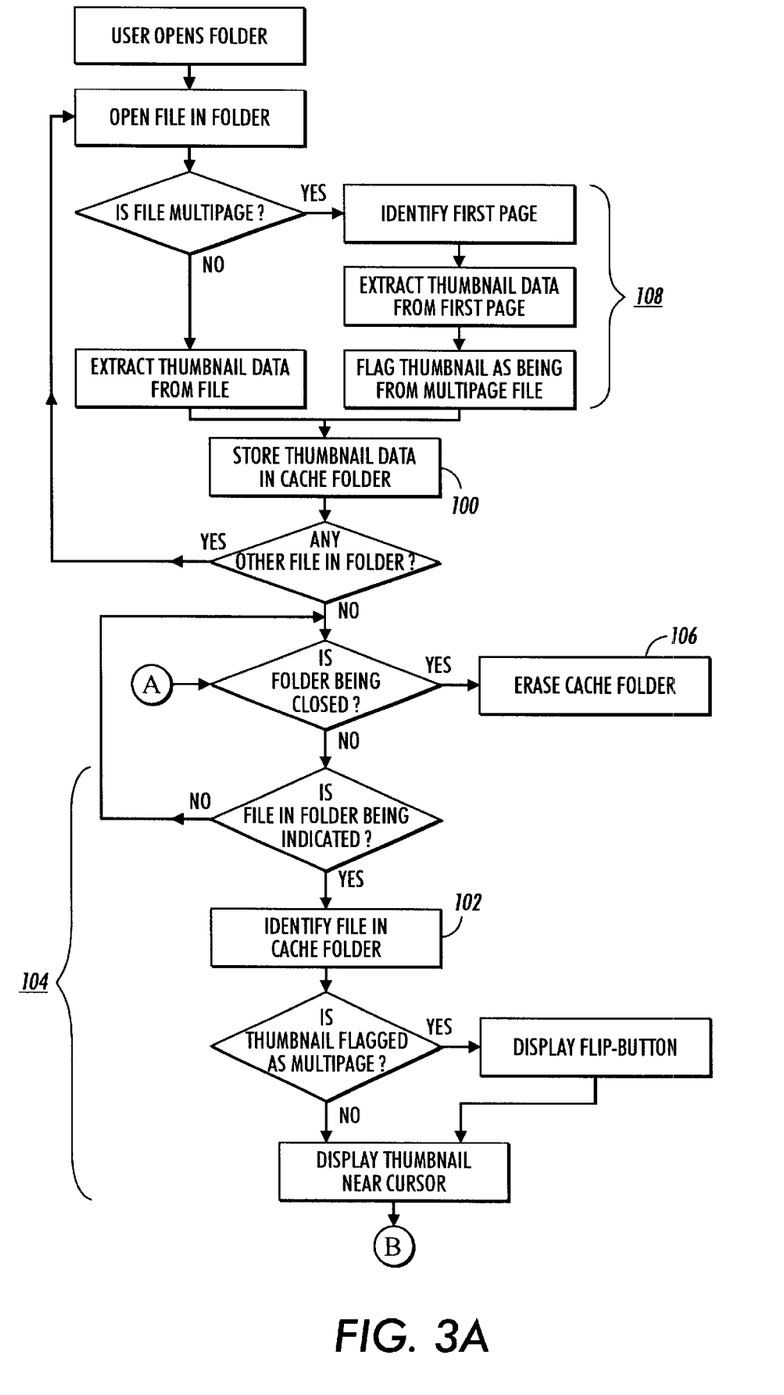
FIGS. 3A and 3B show a simplified flowchart illustrating the basic steps of the method of the present invention.
Figure 3B:
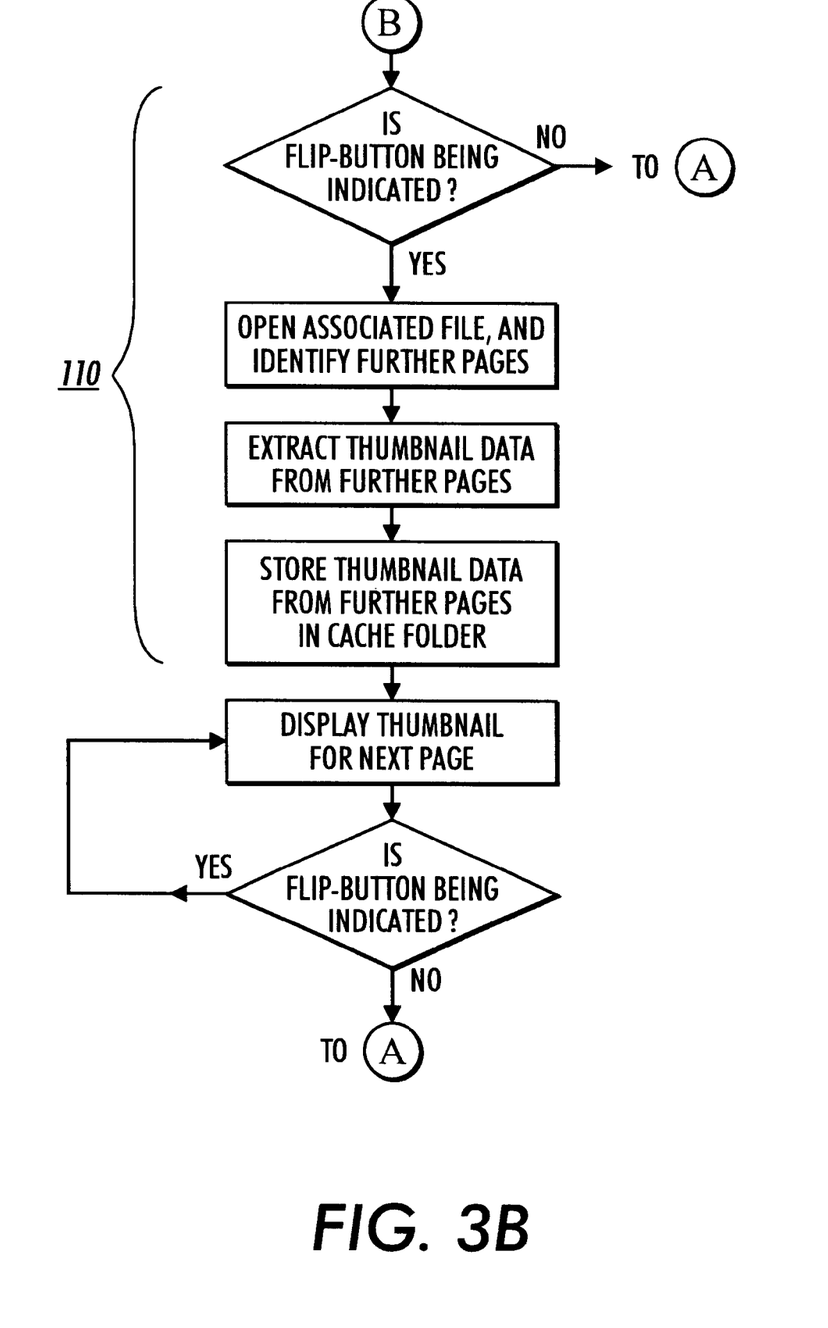

FIGS. 3A and 3B show a simplified flowchart showing the basic operation of the method of the present invention. The functionality shown in the FIGS. can be embodied in code which is superimposed on the basic functions of an operating system, such as through the commercially-available utility "Shell Name Space Extension" in Microsoft® Windows 95™. Following the flowchart, the method of the present invention is activated when a user opens a folder containing files therein, causing the folder space to be displayed on the GUI with icons therein, each icon corresponding to a file such as shown in FIG. 1 above. Once the folder having the files is opened, every file in the folder is opened as a background operation and thumbnail data is derived therefrom, such as at step 100. In the case of a purely graphics file such as in .xif or .jpg or .tif format, this thumbnail data can be readily derived by sampling the graphical data to yield the relatively small thumbnail that will be displayed. In the case of a file, such as in a word-processing format, which is known to be text-exclusive or text-intensive, the thumbnail data can be derived by text-intensive means: For example, programs exist in the prior art which can be used to pull out what are determined to be "key words" of the text document, or the text data can be examined for the presence of proper names or text in a headline-type typeface. More sophisticated programs can even be used to synthesize an abstract of a quantity of text.

The thumbnail data for each icon in the displayed folder is stored in a special "cache folder," and the individual files of thumbnail data are associated with the files in the displayed folder, as at step 102. There will generally be a commonality of file names between the displayed folder and the cache folder; this association of names is particular convenient using the "Shell Name Space Extension" utility. There thus exists, soon after a particular folder is opened and displayed on the GUI, a cache folder which includes files which are essentially immediately available for display.

The thumbnails associated with different files are displayed, according to a preferred embodiment of the present invention, whenever the cursor or other pointing device merely touches or comes within a certain range of the icon associated with a particular file, such as at steps 104. It is preferable to display the thumbnail when the cursor is merely touching the icon, as opposed to requiring, for example, one or two mouse-clicks or equivalent to be provided by the user. Once again, the overall purpose of the thumbnail display is simply to give a "quick glance" at the thumbnail associated with the file. Thus, the size of the thumbnail, in the case of a merely graphically-scaled-down version of a first page of a file, should be just large enough that a casual user could get an overall glimpse of the first page of the file.

In order to maintain an economy of memory using the present invention, the thumbnail data associated with an open folder is preferably erased when there is no longer an immediate need that a particular thumbnail will have to be displayed. According to one embodiment of the present invention, it is possible to cause the cache folder to be emptied or erased when the folder associated with the cache folder at a given time is closed, as at step 106. Alternately, cache folders can remain in existence until the system is shut down, or a timer could be used to erase the cache folder at the end of a work day, or after an elapsed period of time.

Although the overall purpose of the system of the present invention is to provide quick glances at files, in the case of navigating through a quantity of large documents such as multi-page text documents, it may be desirable to provide to a user thumbnails of not only the first page of a text document but also subsequent pages. Thus, according to a particular embodiment of the present invention, a means is provided for enabling the user to take quick glances at further thumbnails of further pages within a multi-page document. Of course, obtaining thumbnail data for subsequent pages of a multi-page document is somewhat at odds with the intention of the invention to keep a relatively small amount of data in the cache folder, so that the cache folder can be quickly generated and accessed. To resolve this dilemma, according to a preferred embodiment of the present invention, the first page of any multi-page document is the only page that is automatically used to derive thumbnail data from any multi-page file in the folder. However, further according to this preferred embodiment, in the case of a thumbnail derived from a multi-page file there is provided with the thumbnail a "flip-button" associated with the thumbnail, which makes available to the user a capability of scrolling through further pages within the multi-page file, as shown at the steps indicated as 108 and 110. With reference to steps 108, if a file is identified as a multipage file at the opening of the folder, the resulting thumbnail data can be flagged. With reference to steps 110, if the flip-button in the thumbnail for the multipage file is indicated, a predetermined number of subsequent pages in the file can be accessed, and suitable thumbnail data, such as a text summary for each of the subsequent pages, can be stored in the cache for viewing in the thumbnail when the flip-button is indicated.

Figure 4:
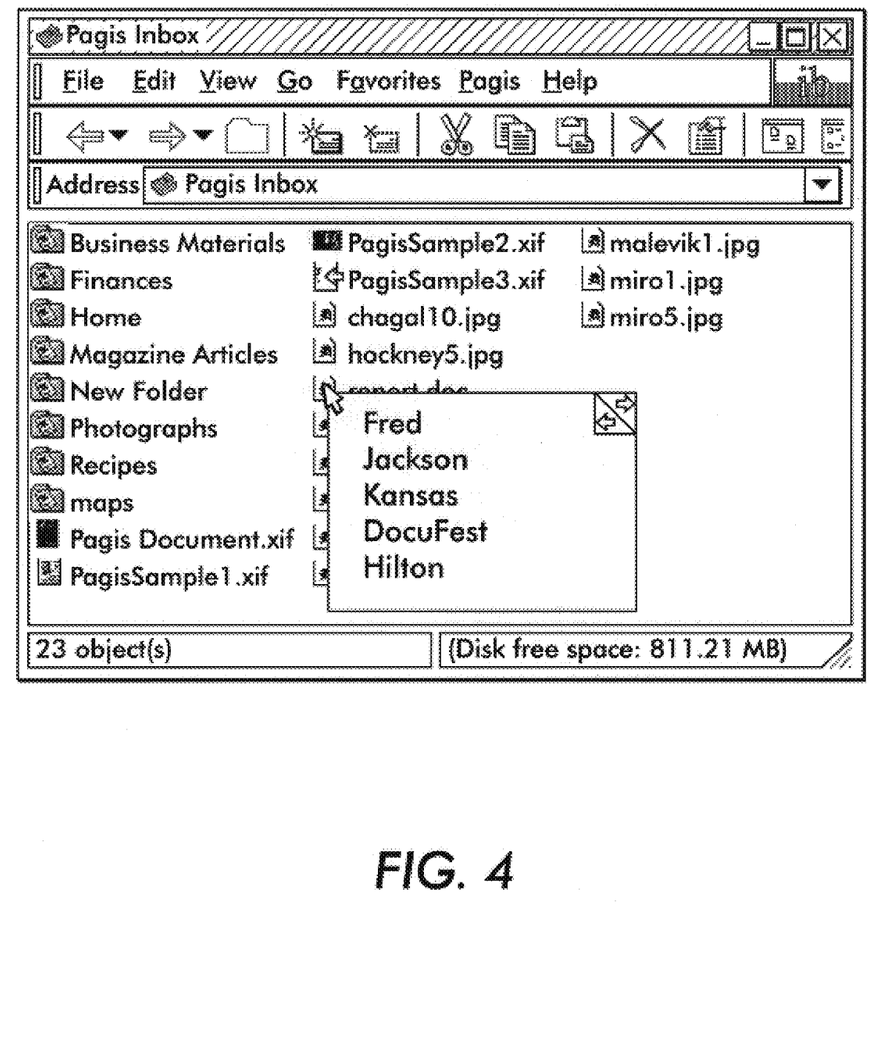
FIG. 4 is a demonstration of the display of a text-intensive thumbnail according to one aspect of the present invention.

An example of a text-intensive thumbnail, showing extracted proper names and headlines, and with an associated flip-button in the top right corner, is shown at FIG. 4. Activation of this flip-button causes the derivation of thumbnail data (either a graphic reduction of subsequent pages, or the extraction of key words or summaries) of the subsequent pages only as needed. Thus, if there exists multi-page files in the folder, as standard practice only the first page of each file will be used to derive thumbnail data, and thumbnail data from further pages will be derived only if specifically requested by the user, by use of the flip-button. Depending on a particular implementation, activation of the flip-button associated with the thumbnail for a multi-page file can cause derivation of the thumbnail data for the entire rest of the multi-page document, or only a certain predetermined number of further pages, such as up to the next ten pages in the multi-page document. Of course, various graphical functional equivalents to the illustrated flip-button, such as a sliding bar or pull-down menu, will be apparent.

The present invention can be distinguished from certain prior art utilities in key ways. It is well known, such as in the consumer versions of the Macintosh® and Windows™ operating systems to provide "help balloons" which are associated with toolbar buttons, and which display short explanations of the functions of different buttons when a cursor is caused to touch a particular toolbar button. The use of these "help balloons" in this context differs from the present invention in that the text of those help balloons is largely immutable and is always associated with a particular toolbar button. In contrast, with the present invention, the thumbnail data, whether a graphical reduction of a page image, or some other derivation of text data, is created on an ad-hoc basis from a standard method which is applied to what ever files are in a particular folder that is opened; further, according to a preferred embodiment of the invention, once the folder is closed, the thumbnail data is erased, and is re-generated next time the folder is opened. There is a significant functional difference in providing help balloons associated with toolbar buttons, which do not change, and providing what is arguably in effect a help balloon associated with a file, in the context where files constantly come and go through a particular computer.

While the invention has been described with reference to the structure disclosed, it is not confined to the details set forth, but is intended to cover such modifications or changes as may come within the scope of the following claims.

What is claimed is:

1. A method of displaying a thumbnail for at least one electronically-stored file in an electronically-stored folder, comprising:

determining the appearance of at least one icon for at least one file in the folder based on at least one of file name or file type;

displaying the at least one icon for the at least one file in the folder to permit a first identification of data in the at least one file;

deriving thumbnail data from the file in the folder, the thumbnail data being a reduced derivative of at least a portion of the data in the at least one file;

storing the thumbnail data for the file in a cache;

associating the file in the folder with its stored thumbnail data in the cache; and when a cursor is positioned to hover over the icon displayed for the file, displaying the thumbnail data associated with the file to permit a second identification of the data in the at least one file in greater detail than the first identification.

2. The method of claim 1, wherein the thumbnail data includes a reduced version of an image in the file.

3. The method of claim 1, wherein the thumbnail data includes a subset of text data in the file.

4. The method of claim 1, wherein the thumbnail data includes data derived from only a first page of the file.

5. The method of claim 1, wherein the thumbnail data is derived upon opening the folder.

6. The method of claim 1, wherein the thumbnail data is displayed by touching the cursor to the icon without a mouse-click.

7. The method of claim 1, wherein the thumbnail data is derived from the file by opening the file as a background operation.

8. The method of claim 1, further comprising:

for files containing multiple pages of data, initially deriving the thumbnail data from only a first page of the file;

when the thumbnail data for the file is displayed, displaying a button for retrieving thumbnail data derived from further pages in the file;

when the button is activated, deriving from the file subsequent thumbnail data, the subsequent thumbnail data being derived from at least one further page in the file; and storing the subsequent thumbnail data in the cache.

9. The method of claim 1, further comprising:

erasing at least a portion of the cache when the folder is closed.

10. A method of displaying a thumbnail relating to an electronically-stored file in an electronically-stored folder, comprising:

determining the appearance of at least one icon for at least one file in the folder based on at least one of file name or file type;

displaying the at least one icon relating to the file to permit a first identification of data in the file; and when a cursor is positioned to hover over the icon without a mouse-click, displaying the thumbnail relating to the file, the thumbnail being a reduced derivative of at least a portion of the data in the file, to permit a second identification of the data in the file in greater detail than the first identification.

11. The method of claim 10, wherein the thumbnail data includes a reduced version of an image in the file.

12. The method of claim 10, wherein the thumbnail data includes a subset of text data in the file.

13. The method of claim 10, wherein the thumbnail data includes data derived from only a first page of the file.

14. The method of claim 10, wherein the thumbnail data includes a summary of data in the file.

15. The method of claim 10, further comprising:

for files containing multiple pages of data, when the thumbnail data for the file is displayed, displaying a button for retrieving thumbnail data derived from further pages in the file;

when the button is activated, deriving from the file subsequent thumbnail data, the subsequent thumbnail data being derived from at least one further page in the file.

16. The method of claim 10, further comprising:

for each file in the folder, deriving thumbnail data from the file;

storing the thumbnail data for each file in a cache;

associating each file with the thumbnail data relating to the file in the cache.

17. The method of claim 16, wherein the deriving step is initiated by opening the folder.

18. The method of claim 10, wherein the thumbnail data from a file is derived by opening the file as a background operation.

19. The method of claim 10, further comprising:

erasing at least a portion of the cache when the folder is closed.

* * * * *